US012170032B2

(12) United States Patent
Jenkins (10) Patent No.: US 12,170,032 B2
(45) Date of Patent: Dec. 17, 2024

(54) PROBATION AND REENTRY COACH APPLICATION

(71) Applicant: Steven P. Jenkins, Rindge, NH (US)

(72) Inventor: Steven P. Jenkins, Rindge, NH (US)

(*) Notice: Subject to any disclaimer, the term of this patent is extended or adjusted under 35 U.S.C. 154(b) by 419 days.

(21) Appl. No.: 17/398,137

(22) Filed: Aug. 10, 2021

(65) Prior Publication Data

US 2023/0052792 A1 Feb. 16, 2023

(51) Int. Cl.
*G09B 7/06* (2006.01)
*G06F 3/0482* (2013.01)
*G06Q 10/1093* (2023.01)
*H04M 1/72451* (2021.01)

(52) U.S. Cl.
CPC ............ *G09B 7/06* (2013.01); *G06F 3/0482* (2013.01); *H04M 1/72451* (2021.01); *G06Q 10/1095* (2013.01)

(58) Field of Classification Search
CPC ....................................................... G09B 7/06
See application file for complete search history.

(56) References Cited

U.S. PATENT DOCUMENTS

| | | | |
|---|---|---|---|
| 5,722,418 A | 3/1998 | Bro | |
| 5,954,510 A | 9/1999 | Merrill | |
| 6,039,688 A * | 3/2000 | Douglas | A61B 5/4866 600/300 |
| 9,171,048 B2 * | 10/2015 | Brust | G06F 3/0481 |
| 9,454,859 B2 | 9/2016 | Roth | |
| 10,825,356 B2 * | 11/2020 | McNichol | G09B 5/065 |
| 11,227,298 B2 * | 1/2022 | Litman | G06F 40/20 |
| 2004/0016437 A1 * | 1/2004 | Cobb | G06Q 10/06375 131/270 |
| 2005/0079477 A1 * | 4/2005 | Diesel | H04L 67/01 434/350 |
| 2007/0122780 A1 * | 5/2007 | Moon | G09B 19/00 434/236 |
| 2007/0224585 A1 * | 9/2007 | Gerteis | G09B 5/00 434/350 |
| 2008/0286741 A1 * | 11/2008 | Call | G09B 5/00 434/350 |
| 2008/0318197 A1 * | 12/2008 | Dion | G09B 7/00 434/365 |
| 2011/0047404 A1 * | 2/2011 | Metzler | G16H 50/20 714/2 |
| 2013/0252224 A1 * | 9/2013 | Smith | G09B 7/06 434/362 |
| 2013/0282419 A1 * | 10/2013 | Braddy | G06Q 10/10 705/7.15 |

(Continued)

FOREIGN PATENT DOCUMENTS

WO 03073236 9/2003
WO 2015009287 1/2015

*Primary Examiner* — Xuan M Thai
*Assistant Examiner* — Sadaruz Zaman
(74) *Attorney, Agent, or Firm* — Lambert Shortell & Connaughton; David J. Connaughton, Jr.; Justin P. Tinger (57) ABSTRACT

A system for aiding in the probation, parole, and social reentry of a justice-involved person (JIP) is provided. The system may be used by both the probation and parole officers, and other justice team members (referred to generally as the justice team), as well as the justice-involved person to better connect JIPs to local services and for engagement and progress tracking.

18 Claims, 10 Drawing Sheets

(56) References Cited

U.S. PATENT DOCUMENTS

| | | | |
|---|---|---|---|
| 2014/0272844 A1* | 9/2014 | Hendriks | G09B 5/00 |
| | | | 434/236 |
| 2015/0132729 A1 | 5/2015 | Hust | |
| 2015/0140527 A1 | 5/2015 | Gilad-Barach | |
| 2016/0321935 A1* | 11/2016 | Mohler | G09B 5/08 |
| 2016/0358495 A1* | 12/2016 | Bushell | G09B 7/06 |
| 2017/0278417 A1* | 9/2017 | Ur | G09B 7/06 |

* cited by examiner

PROBATION AND REENTRY COACH APPLICATION

BACKGROUND

Field of the Invention

The subject matter described herein relates generally to systems for aiding in the probation, parole, and social reentry of a justice-involved person (JIP). In particular, the system may be used by both the probation and parole officers, and other justice team members (referred to generally as the justice team), as well as the justice-involved person to better connect JIPs to local services and for engagement and progress tracking.

Description of Related Art

Recidivism, or the relapse of a person into criminal behavior is a major problem with the United States justice system, among other countries. Indeed, many of those convicted of past criminal acts will end up being involved with the justice system again. While systems such as probation, parole, and similar programs seek to reduce recidivism, they are not particularly effective.

One main cause of recidivism is a difficulty of those who were involved with the criminal justice system to reenter society. Many times, it is difficult to find housing, jobs, and stability. This can lead to substance abuse, and criminal behavior.

Another main cause of recidivism is a lack of support and resources available to the judicially involved person. These people can become easily overwhelmed and without direction without strong guidance, reminders, and starting points.

Therefore, what is needed is a system which can facilitate the tracking and provide guidance for justice-involved people on their parole, probation, and reentry. The system is designed to better connect users to local services that can help improve the social determinants of health, help set up and achieve goals for success, and reduce recidivism.

SUMMARY OF THE INVENTION

The subject matter of this application may involve, in some cases, interrelated products, alternative solutions to a particular problem, and/or a plurality of different uses of a single system or article.

In one aspect, a system for coordinating and facilitating social reentry for a justice involved person is provided. The system involves a user computer having a processor, memory, and a display, as well as a server in networked communication with the user computer, the server storing a quantity of user data relating to the user computer. The user computer is operable to provide a user interface on the display based at least partially on data it receives from the server. The user computer and user interface are operable to present an initial or continuing survey on the user interface. The survey comprises a series of questions and answer options. The server is operable to record a plurality of selected answer options by the user input through the user interface. The user interface also prompts the user to select one or a plurality of goals for social reentry. Further, the system presents a second goal or plurality of goals which are determined by the server based on calculations in light of the survey results from the user as well as previously input or received background information of the user, such as prior substance abuse issues, prior housing problems and employment history. The user and/or system may select a limited number of goals, for example three, for the user to work on at one time. For each goal, the user interface will present one or more action steps to guide user towards completion of the goal. In many cases, the presenting of action steps involves providing a contact or list of contacts for service providers who can help the user to carry out the step. Upon completion of an action step, the user may provide an input through the user interface that the step is completed, such as uploading a document, checking in at a location or event through the user interface, uploading a document or photograph confirming the step completion, and the like. The system further has a second computer in networked communication with the server, the second computer having a processor, memory, and a display. The second computer in communication with the server and operable to present a user interface on the display which presents a quantity of data relating to the user data. This allows others, such as parole or probation officers, social workers, and other justice team members assigned to the user to view the user's status, contact the user, and receive contacts from the user.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present disclosure concerns an interactive system to allow a justice team (probation/parole officers, reentry coordinators, case managers, and the like) and justice involved persons (JIPs) to track progress of the JIP, communicate, and set and track goals. Importantly, the recovery tracking system is operable to receive inputs from the JIP and justice team and can generate appropriate goals and the required steps to reach the goals based on operation of a database and programming in light of the received inputs.

Many of the features of the present invention solve problems in the art, as well as solving computer-specific problems as will be detailed below.

The reentry system contemplated herein begins with a survey tool (which is periodically re-taken by the JIP) that assesses the JIP's situation regarding housing, employment, healthcare needs including addiction treatment and recovery, educational interests, child care needs, transportation and other factors regarding social determinants of health. The system is then able to automatically select and rank goals from a list of options and present these to the JIP. The JIP is also able to self-select goals which they view as the highest priority, and this can be factored into the system-presented goals. In one embodiment of operation, the JIP's self-identified goals may be recorded in a database along with the survey results to generate aggregated data. Past outcomes and results from these users may also be included in the aggregated data to track survey results, goal progression, outcomes, and the like. This data may be combined with the survey results and self-identified goals of other JIPs using the system. In some cases, this data may be anonymized. Once aggregated, the survey results and correlation to certain goals and/or outcomes may be determined. This correlation may then be used to increase the effectiveness and efficiency of the database in providing the recommended goals. For example, if it is found that when survey participants select certain answers pertaining to mental health, that substance abuse is likely, the system may automatically suggest substance abuse treatment or counseling as a top goal. Or, alternatively, if it is found that JIPs self-select goals which are not correlated to their likely challenges, the system may take this into account, along with their survey answers, to suggest more pertinent goals with an explanation as to why. This not only provides superior outcomes, but it improves the operation of the database of the system by increasing efficiency of suggestions.

In some embodiments, if the goals selected by the JIP are different from the system's calculated most-important goals (from the results of the survey and optionally from the aggregated and correlated data from past users), the JIP may choose to select some or all of his or her own goals.

Typically, the JIP will work on a limited number of goals at a time. In one embodiment, the JIP will work on three goals at a time. Depending on goals, the user interface of the system for the JIP user will present immediate next steps as well as progress indicators for the goals. Also depending on goals, the JIP user interface may provide a link or links to local services from a database of approved service providers that may be helpful in completing the next step or steps to accomplish the goal. For example, if "substance abuse treatment" is a goal, a nearby treatment center, or AA/NA program may be presented. Or, if "find housing" is a goal, nearby housing option(s) may be presented. If, "find employment" is a goal, nearby employment services and potential employers may be presented. In some embodiments, the proposed employment proposals may be based on skills and interests expressed by the JIP in the survey questions.

The system further includes a document or evidence upload system which allows the JIP to upload evidence and documents confirming completion of steps towards the goal or the goal itself. For example, the JIP may upload an offer letter or other proof of employment, or a lease as proof of finding housing.

Importantly, the system may be operable to integrate external services and websites into the single system user interface, which can be accessed on a mobile phone app, internet web site, or other internet-connected user interface. For example, completion of the various goals of the system likely will rely on a number of outside vendors or sources. For example, finding housing will rely on a real estate agent, apartment listing service, charitable housing service, state public housing options, and the like. Similarly, searching for employment will likely involve the use of outside services such as job search websites, job application portals on employer websites, and job placement services which can be at least initially accessed through a web portal. In the same way, for substance abuse issues, many recovery services are at least initially accessible to sign up for through internet accessible portals such as a web portal or app. In all of these instances and for other services, the system may be operable to integrate and/or communicate directly with the outside systems. For example, in one embodiment, the user interface may have an embedded window or screen portion which directly displays the service website within the app/website of the system while also displaying a portion of the user interface. This allows the JIP user to navigate the external website within the user interface of the system app or website interface. In another embodiment, the system may be able to interface with an external system, for example through an API or other direct communication. This allows the user to input their own information through the user interface of the system, and then the system will directly communicate with the outside service. In some further embodiments, in the event of such direct communication between system and external service, a user's information may be automatically stored in a system memory, and may automatically populate certain fields within the external service's system. This convenience further reduces the challenges JIP's face with being overwhelmed and exhausted by repeated filling out of applications for jobs, housing, and so on. This in turn increases the efficiency of the system and databases therein.

This integration of the system user interface with the various and different service providers solves the computer specific problem of navigating away from the portal of the system, potentially never to return. It also makes it easier and less overwhelming for the JIP to manage the many tasks by being able to carry them out within the system, rather than navigating to the various different service websites individually. Further, by integrating the present system with outside services, the JIP is very clearly able to see the actions visually connected to the specific steps and goals laid out by the system.

In one embodiment of the system, an app which includes the JIP user interface, among other features may be installed on a portable computing device such as a mobile phone, smartphone or tablet. The portable computing device may include a GPS receiver or transceiver, cellular receiver or transceiver, or other location receiver. Accordingly, the app and system may be operable to track the location of the JIP. This can be useful to confirm that the JIP is indeed living at a certain location, going to treatment centers or meetings, and/or going to a job. One common problem for JIPs on parole or probation is a difficulty in getting consistent and reliable information. This location service can work to confirm that the goals being met are being followed through on.

The system may further be configured, especially when implemented on a mobile device such as a mobile phone or tablet to utilize facial recognition or biometric sensors such as a fingerprint scanner to act as an identification device to allow the JIP to certify that he or she is carrying out a step to achieve the goal. For example, the JIP may check in at a job location using a combination of the GPS sensor and the identification confirmation, which will all but certify that the JIP is indeed at the job location. The same concept could be used for location confirmation for housing, substance abuse treatment, and any other location based step or goal. Indeed, accountability and security are meaningful challenges for JIPs. The present system contemplated herein solves this problem by a two-level confirmation using location and identification confirmation to ensure that the JIP is in a particular location at a particular time. This also improves the functioning of the phone or device because it utilizes it as a way to confirm a person is in a place at a certain time. It is well known that a problem in the computerized field is the ability to falsify or improperly manipulate data, and a lack of security in general, but the above solution addresses this.

In one embodiment, the user interface of the system for the JIP may be operable to provide quick access to a list of various support services. These may be accessible within the system user interface. Thus, if the JIP is struggling with a certain issue, they may be able to navigate by problem, need, or support service category and title to more easily find support services and contacts. This further solves the problem of a feeling of being overwhelmed with choice and a lack of guidance as to how to solve a problem or find support when needed. Further making the "sourcing" of support services easier for a JIP, the user interface may be operable to call the support service with the touch of a button on the user interface or to open up a contact form or automatically populated an email with the contact address to streamline the contacting of the support service provider.

In still further embodiments, the user interface of the system for the JIP may be operable to allow the JIP to request additional support. For example, if the JIP is admittedly struggling with completing a step towards a goal, or the goal itself, the JIP may actuate this feature through the user interface. This may automatically contact a justice team member for the JIP to seek support, and/or may put the JIP in communication with a system support operator to further guide the JIP. In a similar embodiment, a communication portal may be implemented by the system which allows a member of the JIP's justice team to send a message directly to the JIP. In a particular embodiment, the communication will be one way such that the JIP cannot message the justice team member back, but could contact in another way such as a phone call and the like.

The system may utilize a number of other features to increase engagement with the JIP. For example, the system may provide automatic progress alerts to periodically inform the JIP about how they are progressing towards their goals. These may be in the form of emails, text messages, alerts within the user interface, push notifications to a phone or other mobile device, and the like. Similarly, the user interface of the system may allow for periodic surveys to be made available to the JIP to solicit feedback, status, and opinions of the JIP. In one embodiment, motivational quotes may be presented through the user interface or other communication to provide daily encouragement to the JIP.

A daily or other periodic log or journal may be integrated into the user interface of the system. This may allow the JIP to record thoughts, feelings, challenges, and the like into the system. The justice team may have access to this journal and can respond or record the journal. In a further embodiment, the system may utilize a processor on a system server to automatically review the journal based on an artificial intelligence system to automatically identify and flag potential positive or negative outcomes based on journal entries. This may be conveyed to the justice team to allow the justice team to provide an intervention at an early time, provide added support, and/or provide congratulations and encouragement for a job well done.

The system user interface for the JIP may also include documentation such as the department of corrections case plan and other related documentation for the JIP. It may also include an integrated calendar to record appointments and events for the JIP as part of the steps and goal setting. Notifications may be provided to the JIP based on this calendar, reminders on next steps for steps and goals, and the like.

One aspect of the invention may also include a non-transitory computer readable medium having instructions allowing and instructing the data processor to carry out the steps required during operation of the inventive system, as described herein. This non-transitory computer readable medium may be stored within the housing of a system server, and/or user computer, or may be accessible through an electronic communication system such as a network and/or internet connection.

The system further provides access and support for the justice team through a justice team user interface which will be different from the JIP's user interface side of the system. Primarily, the user interface for the justice team will include a number of different JIP's who are assigned to that justice team individual, as it is well known in the art that parole officers, probation officers, social workers, and other members of the justice team have many cases at once. The user interface of the justice team allows viewing of the JIP, the JIP's goals, justice plan information such as release date, next appointments, goal dates, and the like. The user interface also allows access to the JIP's journal and any messages sent by the JIP or to the JIP. In one embodiment, a visual indication such as a series of blocks or shapes, a progress bar or pie chart may indicate goal progress which can identify what step of a certain goal the JIP is at. In a further embodiment, a counter may indicate a number of days that the JIP has been at the particular step or goal. A higher number of days since completing a step may indicate that the JIP is struggling with that step. This acts as a visual reminder to the justice team that that the JIP could use potentially use additional support and encourages the justice team to reach out to the JIP through the user interface.

The justice team system user interface includes a number of features to facilitate communication and engagement with the JIP. Some are noted above including an ability to send and/or receive messages to and from the JIP. The justice team may also schedule appointments, send surveys, and send notifications to a JIP. An attendance tracker may be accessible through the justice team user interface. The attendance tracker is operable to record meetings between the justice team and JIP, as well as attendance of events and appointments for the JIP related to the steps to meet the selected goals. The attendance tracker may, in one embodiment, automatically record attendance data for the JIP based on known time and location information. For example, if the JIP is to attend AA/NA meetings at a certain time and location every week, a location service on the JIP's mobile phone or other device may confirm that the device is at the location at the particular time. This could then be recorded in the system as "attended" whereas if it is not at the location at the right time, it could be recorded as absent, which could be viewed by the justice team.

The justice team user interface is in communication with the system server, which can record JIP data in its system and track progress. The server is able to communicate both to the justice team and JIP and serves as a central database of the system.

Figure 1:
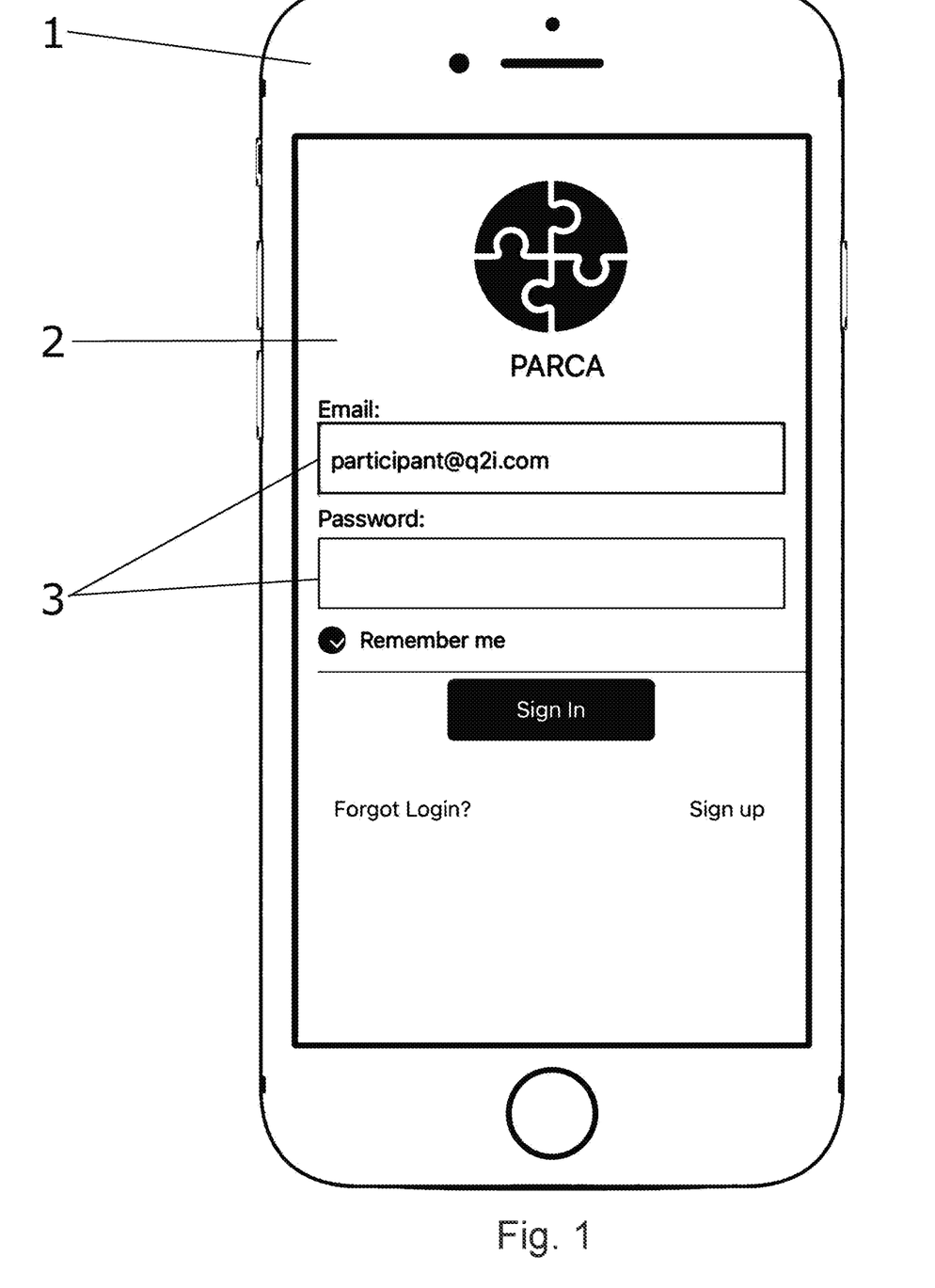
FIG. 1 provides a view of a user interface of an embodiment of the system contemplated herein.

Turning now to FIG. 1, an embodiment of a login user interface is provided. In this embodiment, the user interface 2 is in the form of a system app on a mobile smartphone 1. However in other embodiments, the user interface 2 may be a web browser interface. The email and password allows the user to access their account. Other login options may be available such as a facial recognition, fingerprint scan, and other similar biometric sensor confirmations.

Figure 2:
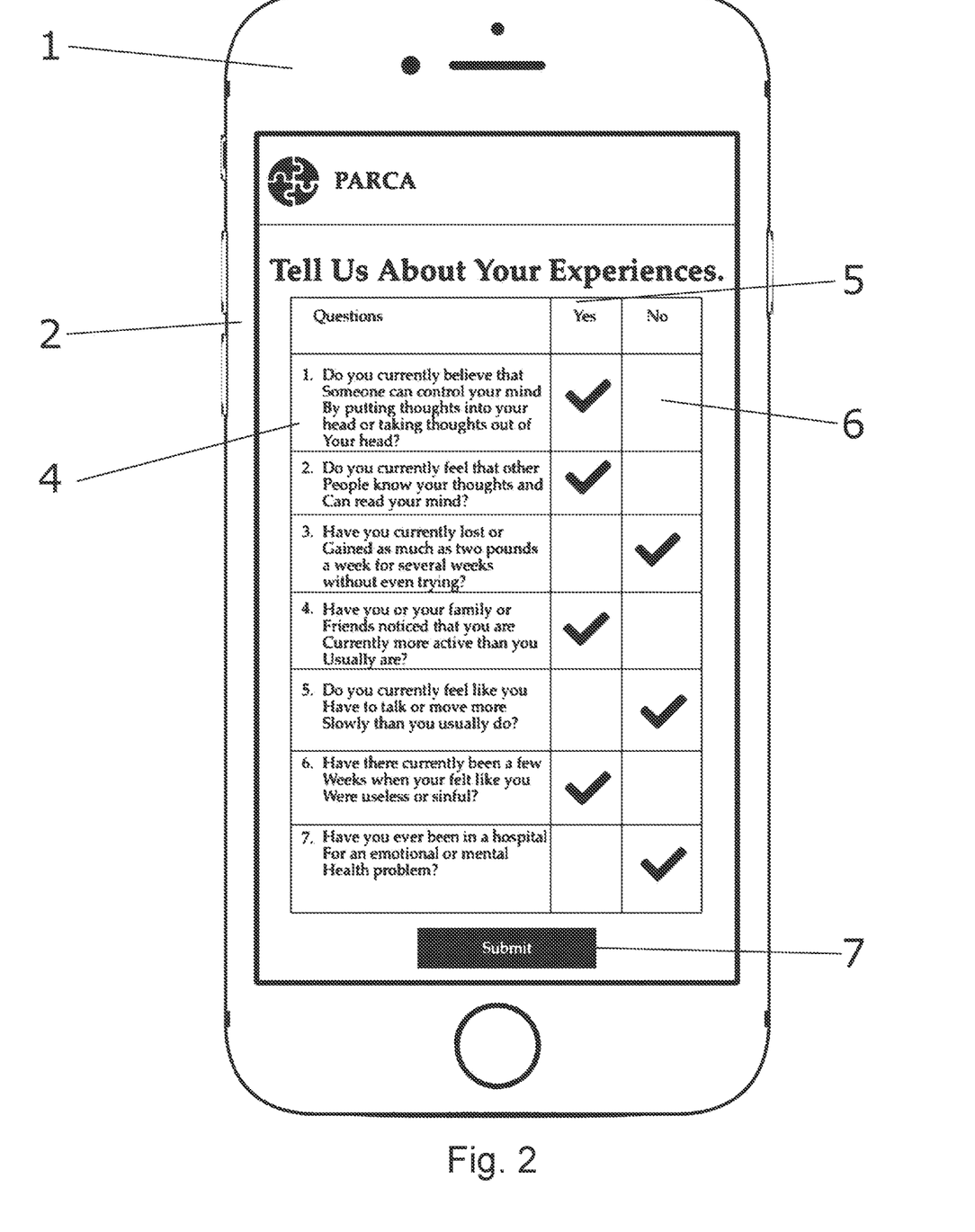
FIG. 2 provides a view of another embodiment of a user interface of an embodiment of the system contemplated herein.

FIG. 2 provides a view of an embodiment of a survey of the user interface. The user interface 2 is in the form of a system app on a mobile smartphone 1. The survey 4 is structured as a yes/no survey, allowing a user to provide an input to the touch screen in the yes column 5 or no column 6. A user can then submit 7 the survey results once completed. The results will then be transferred via a networked connection to the system server (not shown) and recorded in the user's user profile stored as user data on the server.

Figure 3:
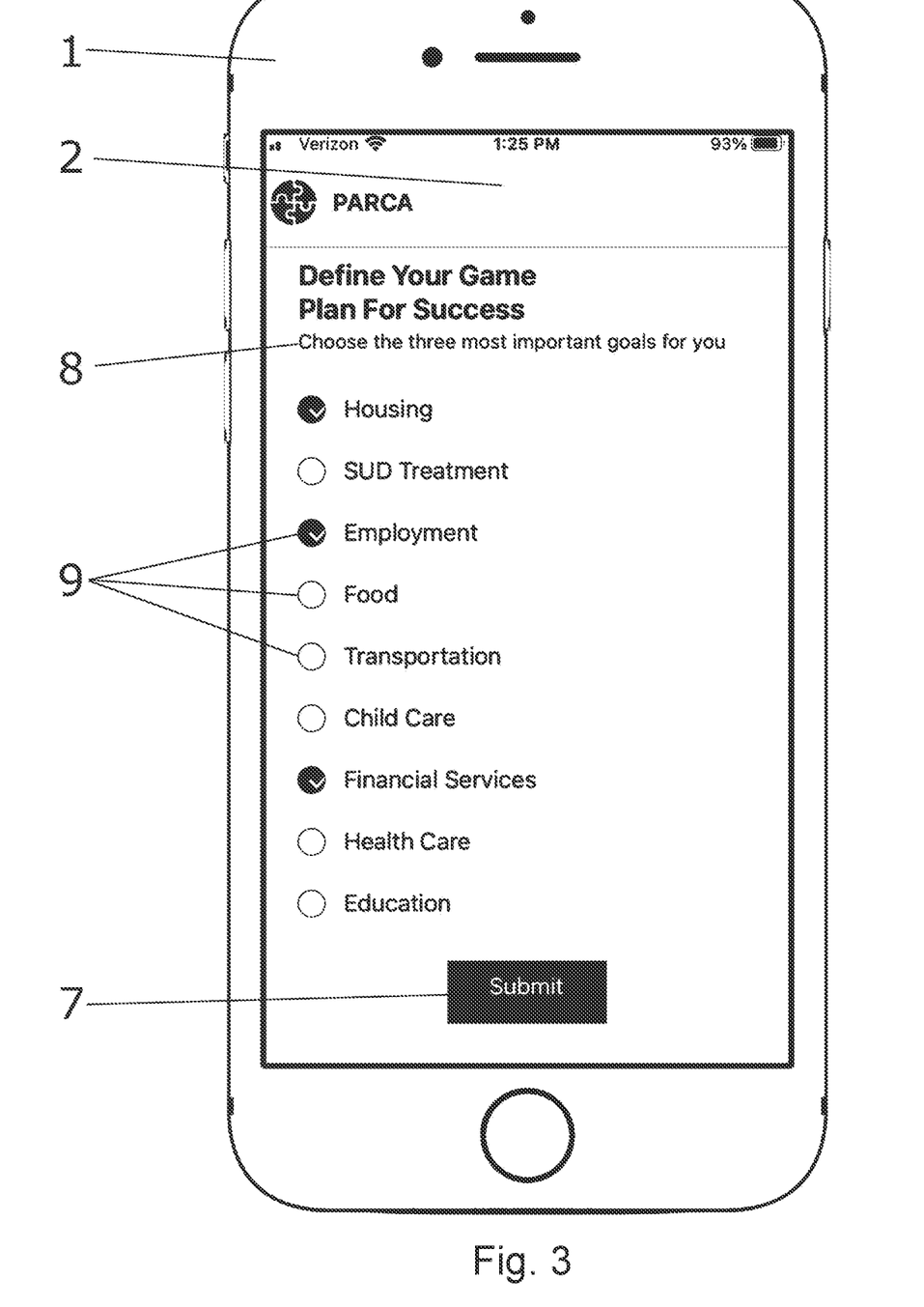
FIG. 3 provides a view of yet another embodiment of a user interface of an embodiment of the system contemplated herein.

FIG. 3 provides a view of an embodiment of a goal selection process of the user interface. The user interface 2 is in the form of a system app on a mobile smartphone 1. The user interface displays various goals that a user may select to focus on as part of the social reentry. In this embodiment, only three may be selected at a time. Once goals are completed, the user may select additional goals. The goal selection 8 allows the user to select goals by actuating a check field 9, and then submit 7 the selections. The results will then be transferred via a networked connection to the system server (not shown) and recorded in the user's user profile stored as user data on the server.

Figure 4:
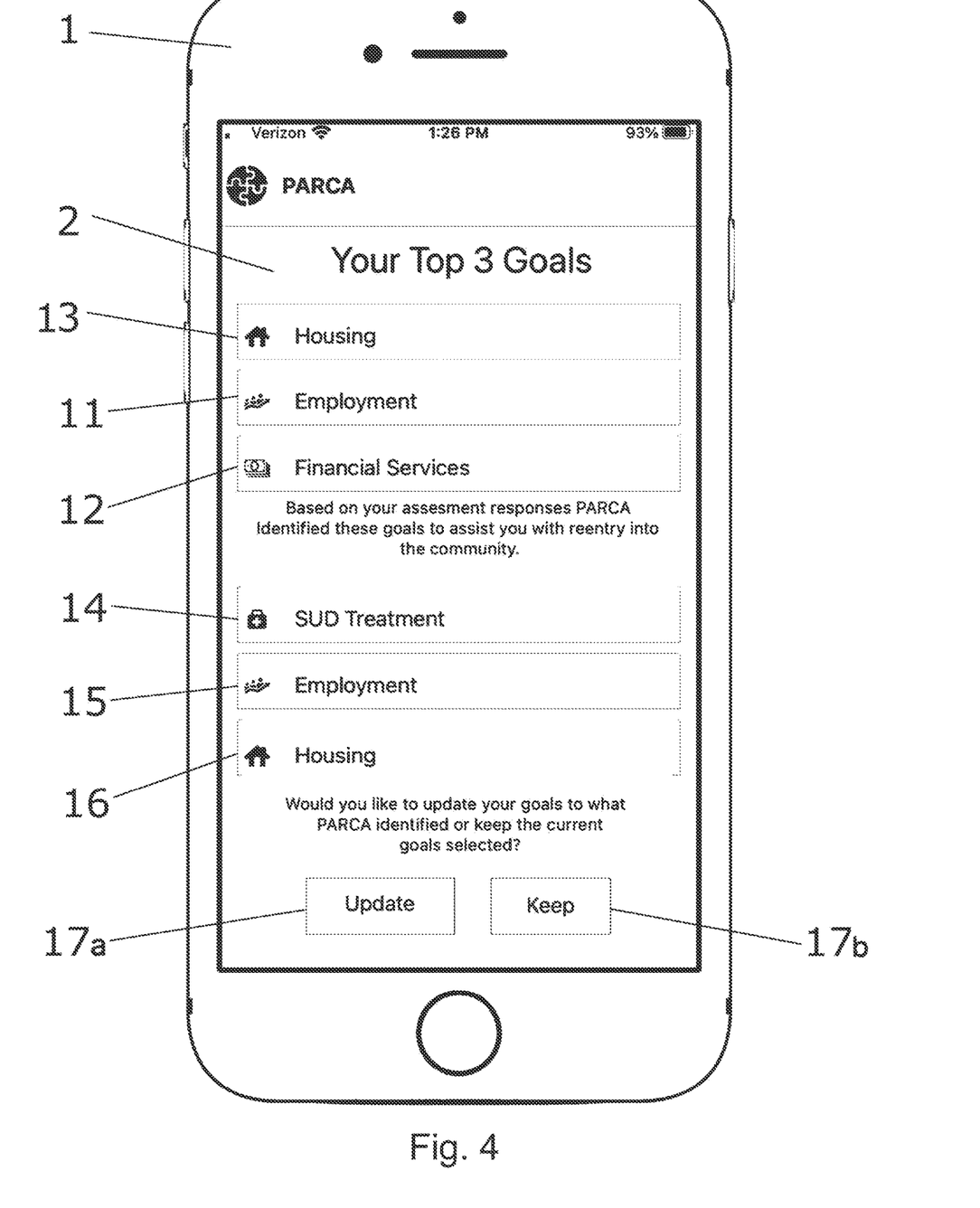
FIG. 4 provides a view of still another embodiment of a user interface of an embodiment of the system contemplated herein.

FIG. 4 provides a view of an embodiment of a goal selection process of the user interface. As in some other views, the user interface 2 is in the form of a system app on a mobile smartphone 1. The user interface 2 shows the user their selected goals 11, 12, 13, compared to the systems selected goals 14, 15, 16. In this embodiment, the user can select to update 17a their goals to match the system selected goals, keep their own goals 17b, or select some of their own goals and some of the system selected goals by actuating certain of the goal areas and selecting update 17a.

Figure 5:
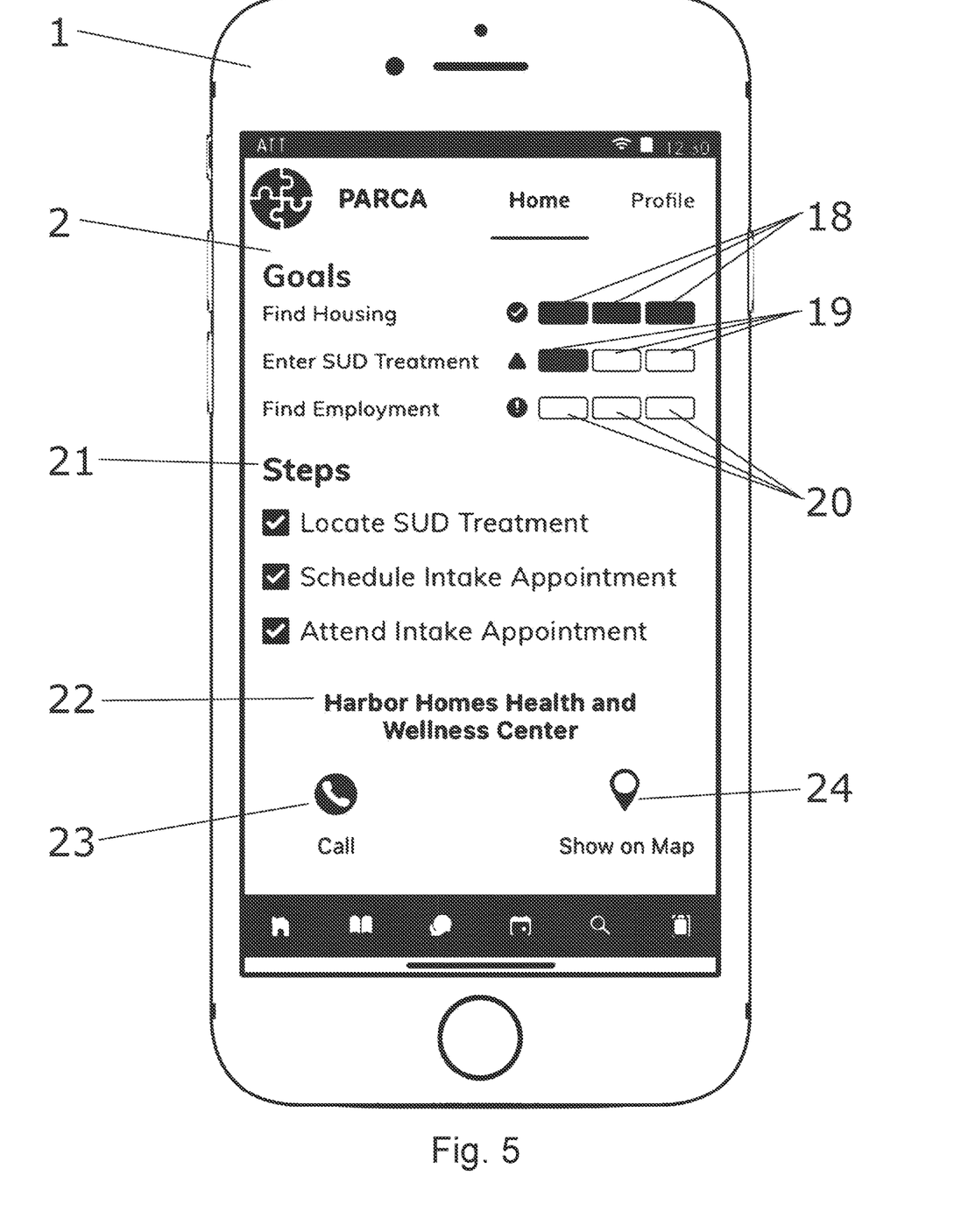
FIG. 5 provides a view of another embodiment of a user interface of an embodiment of the system contemplated herein.

FIG. 5 provides a view of an embodiment of a goal status and action step of the user interface. As in some other views, the user interface 2 is in the form of a system app on a mobile smartphone 1. The user's goals are listed with visual indications of the status of the steps to achieve the goal. For example the user has achieved the "find housing" goal as indicated by the check mark. The user has also completed each step 18 as indicated by a darkened box. In this view, the user has not completed the "enter SUD treatment" and "find employment." The steps 19 for enter SUD treatment have been partially completed as indicated by one filled box, while none of the find employment steps 20. The steps 21 for the goal of entering SUD treatment are also shown on the user interface 2. These steps include locating the substance abuse disorder treatment, scheduling an intake appointment, and attending the intake appointment. To further make things easier for the JIP and improve likelihood of completion of the step, a service provider 22 and contact information (call option 23, and map view 24) is provided integrated into the user interface. As discussed above, this integration of service provider contact information solves the computer based problem of causing the user to have to navigate away from the system user interface, possibly never to return.

Figure 6A:
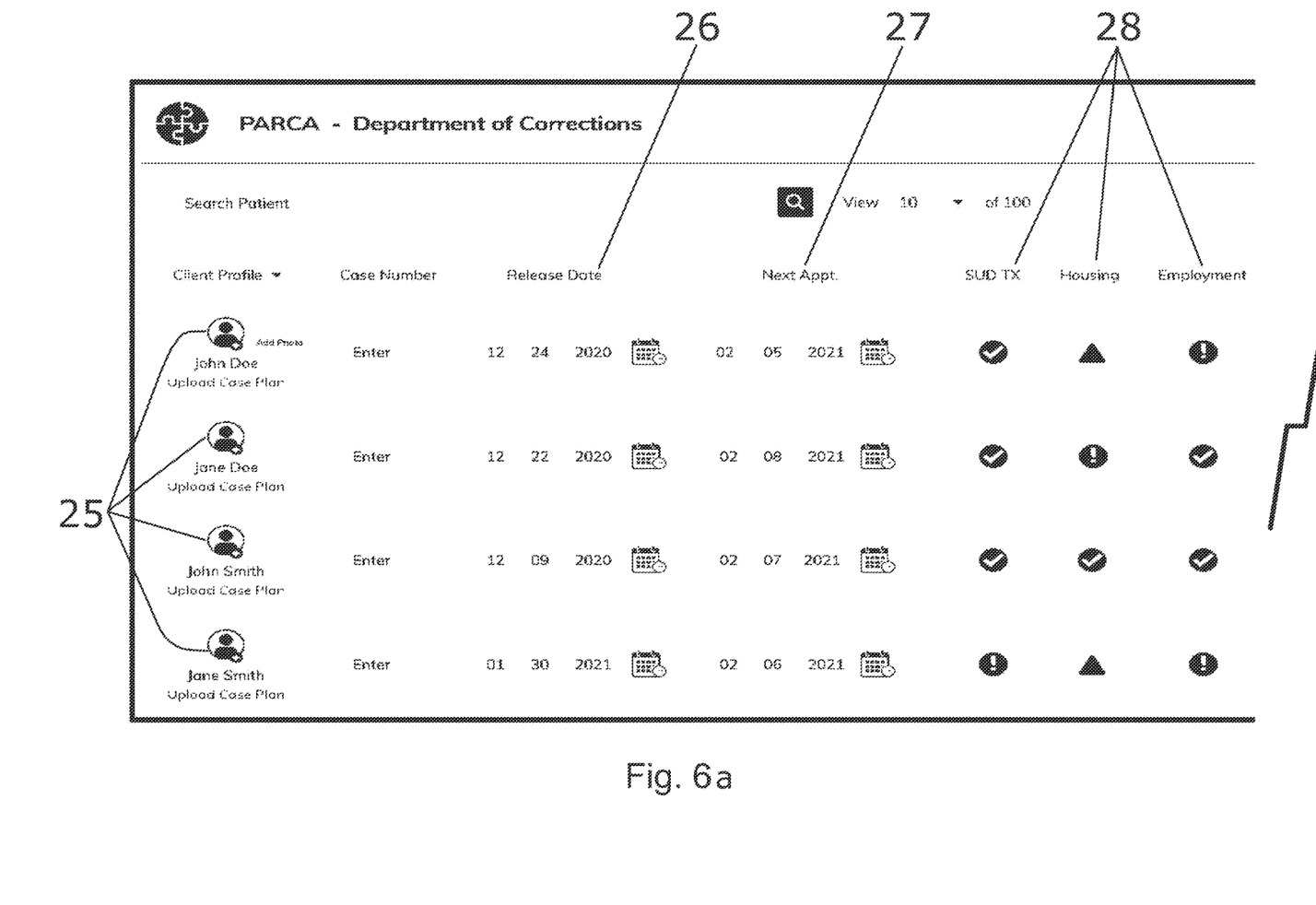
FIG. 6A provides a view of another embodiment of a user interface of an embodiment of the system contemplated herein.
Figure 6B:
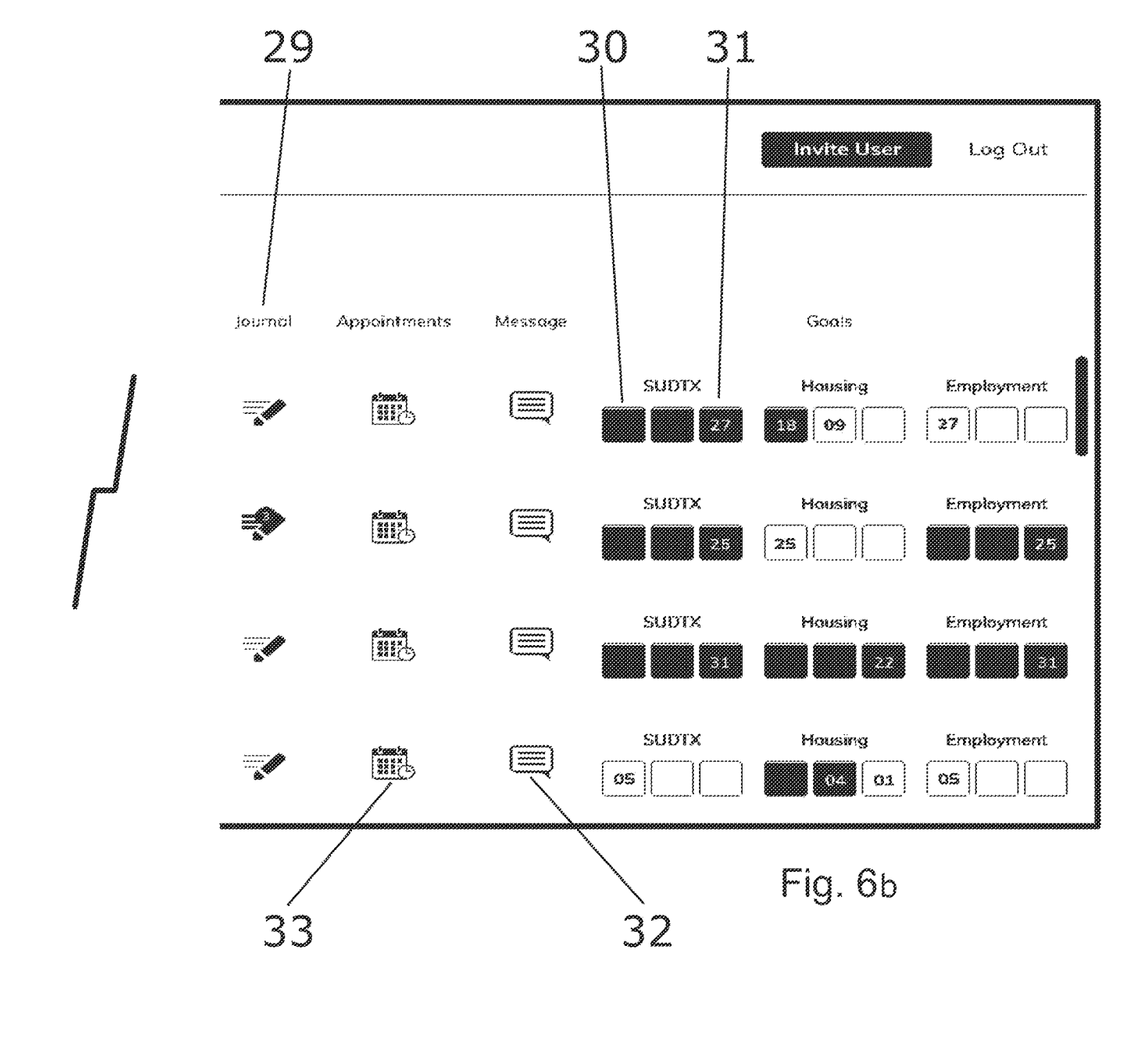
FIG. 6B provides a continued view of the user interface of FIG. 6A.

FIGS. 6A and 6B provides a view of an embodiment of the user interface presented to the justice team. The user interface lists the different cases 25 that the justice team member is overseeing, including case number, release date 26, next appointment 27, and a listing of the goals 28 of the particular JIP. A status indicator is listed corresponding to the goal shows the status of the goal, if is completed, not yet completed, or incomplete and needs action by the justice team due to a long delay. The justice team member can also view the JIP's journal 29, upcoming appointments 33, and any messages 32 sent from the JIP or to the JIP. Further, the justice team member can see what steps of each goal are completed based on filled in or empty boxes 30. Also, a counter 31 is displayed on the most recently completed filled-in box 30 which displays a number of days since completion of the last step. A higher number of days indicates that the JIP could potentially need additional help, guidance, or a check in or reminder to keep making progress.

Figure 7:
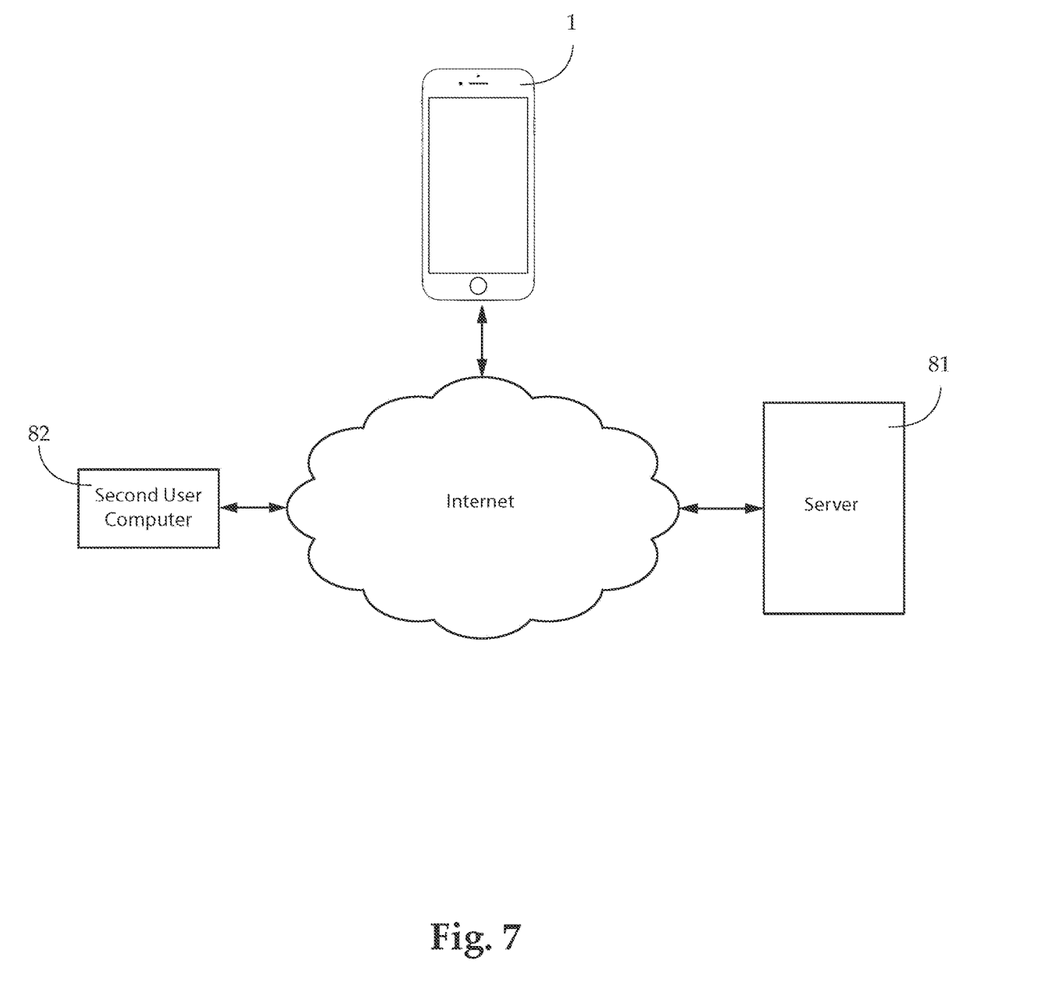
FIG. 7 provides a schematic view of an embodiment of the system components.

FIG. 7 shows a schematic view of an embodiment of the system elements. The JIP's user computer 1, shown here as a smartphone, is in communication with the server 81 through an internet based networked connection. A second user computer 82, operable by a member of the justice team for the JIP is also in communication with the server 81. Communication between the user computer 1 and second user computer 82 may be via the server 81, or may be via an internet connection between the two.

Figure 8:
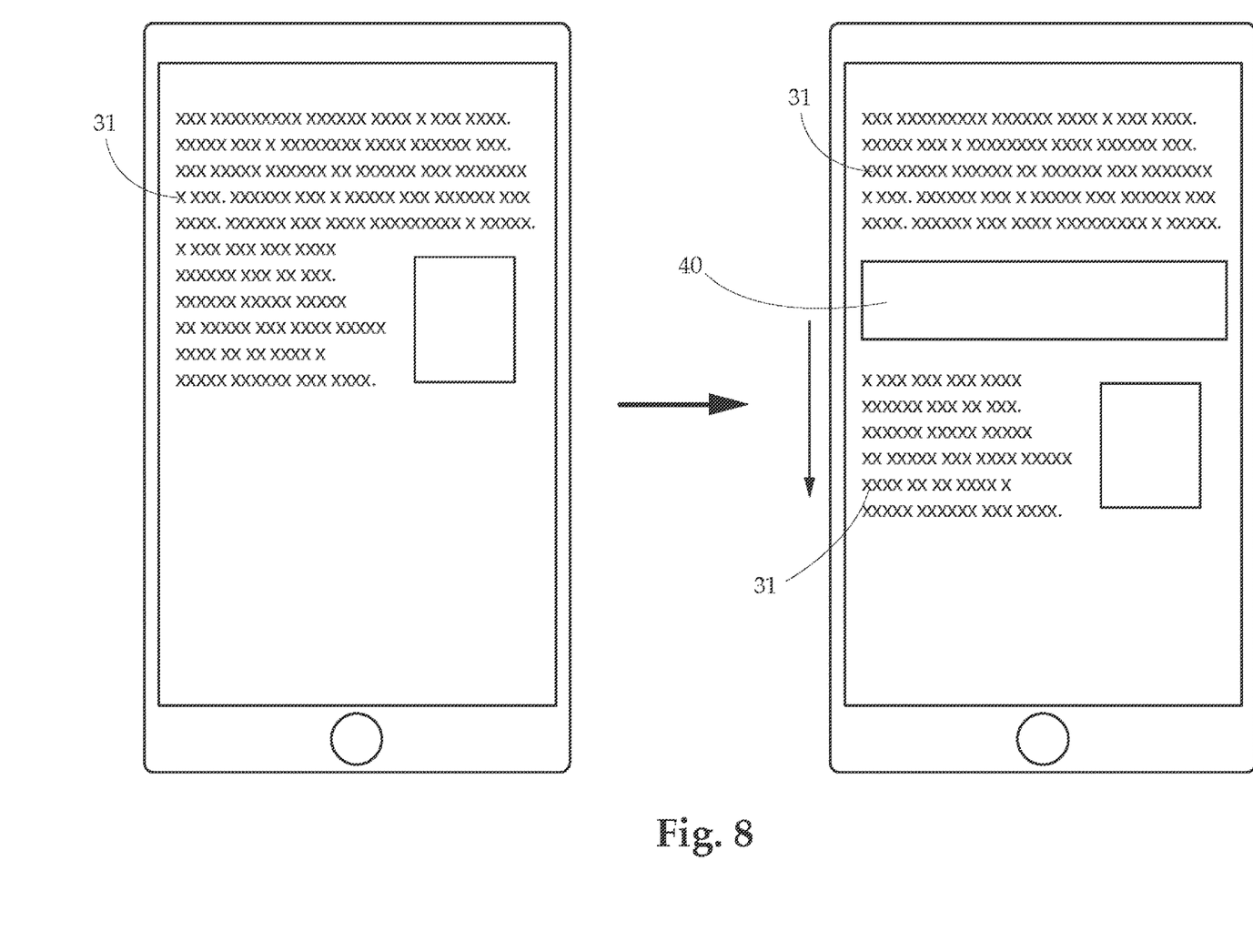
FIG. 8 provides a view of a user interface operation of the system contemplated herein.

FIG. 8 shows an embodiment of a user interface of the present system. This figure demonstrates how the user interface can present information relating to an external service provider, which is accessed from an external source but is presented within the user interface. In this embodiment, the user interface 31 initially contains writing and images relating to the system. On the right side however, the system has dynamically inserted the external service provider information 40 in line with the user interface 31 and has shifted content downward to make room for the research information 40. In other embodiments, research information 40 may be presented in a window which overlays or is embedded into the existing user interface 31.

Figure 9:
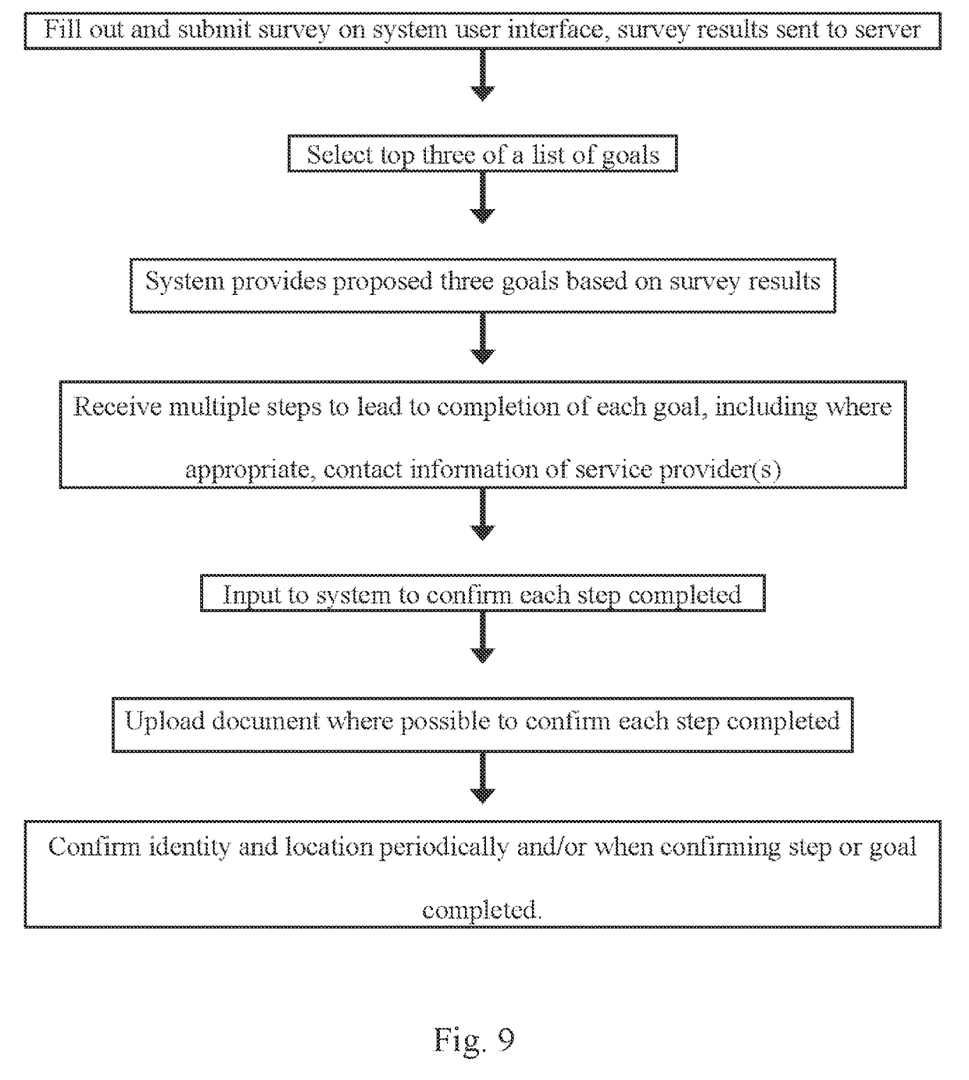
FIG. 9 provides a flowchart of an embodiment of operation of the system contemplated herein.

FIG. 9 provides a flowchart of the steps of one embodiment of the present invention. Initially, the user fills out and submits a survey on the system user interface. These survey results are sent to the server and stored in a memory on the computer relating to the user. The user is also prompted to select a top three goals from a list of goals. After receiving the survey results, the server is operable to send a recommended top three goals based at least in part on the user's survey results. Once goals are selected, the user receives, via the user interface, multiple steps which drive towards the completion of each goal. Where appropriate, contact information of a service provider or providers can be sent to the user to aid in their completion of the step. The user is then able to provide an input to the system to confirm when a step is completed. In addition to this, the user is able to upload a document such as a photograph of the user at a location, a certificate of completion, job offer, lease, or the like. Moreover, the system may prompt a user to confirm their identity by entering a passcode, facial or other biometric recognition, and the like. The identity confirmation may also be performed when the user indicates that they have completed a step or goal.

As discussed herein, the computerized embodiments of the present disclosure, some embodiments of the present invention may be practiced on a computer system that includes, in general, one or a plurality of processors for processing information and instructions, memory for storing information and instructions, modules as software units executing on a processor, an optional user output device such as a display screen device (e.g., a monitor) for display screening information to the computer user, and an optional user input device.

As discussed throughout this disclosure, it will be appreciated by those skilled in the art that the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A system for coordinating and facilitating social reentry for a justice involved person comprising:
    a user computer having a processor, memory, and a display;
    a server in networked communication with the user computer, the server storing a quantity of user data relating to the user computer;
    the user computer operable to provide a user interface on the display based on a data received from the server, the user computer operable to:
        present a survey on the user interface, the survey comprising a series of questions and answer options, the server operable to record a plurality of selected answer options by the user input through the user interface;
        receive an input through the user interface from the user to select a plurality of goals for social reentry;
        present to the user via the user interface a second plurality of goals calculated by the server based on the survey results and a background information of the user;
        present to the user a plurality of action steps to reach at least one of the plurality of goals and second plurality of goals;
        receive an input from the user each time one of the plurality of steps has been achieved;
        receive an uploaded file evidencing that one of the plurality of steps has been achieved; and
        wherein the presenting the plurality of action steps comprises providing at least one service provider or contact to provide a specific action step for the user to take;
    the system further comprising a second computer in networked communication with the server, the second computer having a processor, memory, and a display, the second computer in communication with the server and operable to present a user interface on the display which presents a quantity of data relating to the user data;
    wherein the user computer is operable to integrate an external service provider website from the second computer into the user interface on the display, the user interface having an embedded window portion which directly displays the quantity of data from the external service provider website while also displaying a portion of the user interface;
    wherein the user interface displays a link to the external service provider website, the link being associated with at least one of the plurality of action steps to reach at least one of the plurality of goals or the second plurality of goals for social reentry;
    wherein the user computer is operable to display the embedded window portion simultaneously with the portion of the user interface in response to an input selecting the link to the external service provider website; and
    wherein the embedded window portion of the user interface is operable to receive an input and the user computer is operable to transmit the received input directly to the external service provider website and to receive a response to the received input from the second computer and present information relating to the response on the external service provider website displayed within the embedded window portion of the user interface.

2. The system of claim 1 wherein the server is operable to store the user's survey results and self-identified goals, the server is further operable to aggregate the survey results and self-identified goals with a quantity of other data from other users to create an aggregated data and to correlate survey results with appropriate goals; and
    wherein the presented second plurality of goals is calculated at least partially based on the aggregated data.

3. The system of claim 2 wherein the aggregated data further comprises past outcome data from other users.

4. The system of claim 1 wherein the user interface is further operable to receive an input of at least one of the plurality of goals and at least one of the second plurality of goals as selected goals, and operable to present a plurality of steps to achieve each of the selected goals.

5. The system of claim 1 wherein the user computer is operable to retrieve a quantity of user information stored on the server, and wherein the user computer is operable to input the user data to a field or fields of the external service provider website while the external service provider website is being displayed within the embedded window portion of the user interface.

6. The system of claim 1 wherein the user computer is operable to retrieve a quantity of user information stored on the server, and wherein the user computer is operable to input the user data to the external service provider.

7. The system of claim 1 wherein the user computer comprises a location receiver, and wherein the user computer is operable to record a location information of the computer when receiving an input through the user interface and transmit the location information to the server.

8. The system of claim 7 wherein the user computer is operable to transmit the location information to the server when a user inputs a step or goal achievement information.

9. The system of claim 1 wherein the user computer further comprises an identification device, the identification device being at least one of a camera for facial recognition, a fingerprint scanner for fingerprint recognition, and a biometric sensor, the user computer operable to record an identification confirmation using the identification device.

10. The system of claim 9 wherein the user computer is operable to send the identification confirmation to the server.

11. The system of claim 8 wherein the user computer further comprises an identification device, the identification device being at least one of a camera for facial recognition, a fingerprint scanner for fingerprint recognition, and a biometric sensor, the user computer operable to record an identification confirmation using the identification device.

12. The system of claim 11 wherein the user computer is operable to send the identification confirmation to the server when the user inputs the step or goal achievement information.

13. The system of claim 11 further comprising a calendar stored on the server, the calendar comprising an appointment including a date, time, and location, and wherein the user computer is operable to record a location at the date and time of the appointment and send the location to the server, the server operable to determine if the user computer is at the appointment by comparing the location of the appointment with the location data of the user computer.

14. The system of claim 1 wherein the server is operable to track a number of days that the user has been working on a step without completing the step.

15. The system of claim 14 where the server is operable to send a notice to the second computer after the tracked number of days exceeds a predetermined number of days.

16. The system of claim 1 wherein the user computer is a smartphone.

17. The system of claim 1 wherein the user interface is a system application.

18. The system of claim 1 wherein the user interface is a web interface.

* * * * *